(12) United States Patent
Kirchner

(10) Patent No.: US 10,670,149 B2
(45) Date of Patent: Jun. 2, 2020

(54) GAS SEAL

(71) Applicant: Siemens Aktiengesellschaft, Munich (DE)

(72) Inventor: Christian Kirchner, Rheinberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/330,879

(22) PCT Filed: Aug. 14, 2017

(86) PCT No.: PCT/EP2017/070543
§ 371 (c)(1),
(2) Date: Mar. 6, 2019

(87) PCT Pub. No.: WO2018/050378
PCT Pub. Date: Mar. 22, 2018

(65) Prior Publication Data
US 2019/0186635 A1 Jun. 20, 2019

(30) Foreign Application Priority Data
Sep. 13, 2016 (EP) .................................. 16188481

(51) Int. Cl.
*F16J 15/34* (2006.01)
*F16J 15/36* (2006.01)
*F16J 15/38* (2006.01)

(52) U.S. Cl.
CPC ........... *F16J 15/3464* (2013.01); *F16J 15/36* (2013.01); *F16J 15/38* (2013.01)

(58) Field of Classification Search
CPC ...... F16J 15/34; F16J 15/3436; F16J 15/3452; F16J 15/3464
See application file for complete search history.

(56) References Cited

U.S. PATENT DOCUMENTS 5,370,403 A * 12/1994 Sedy .................... F16J 15/3452
277/390
5,558,342 A * 9/1996 Sedy .................... F16J 15/3464
277/390

(Continued)

FOREIGN PATENT DOCUMENTS

DE 3925403 A1 1/1991
DE 20217983 U1 2/2003
(Continued)

OTHER PUBLICATIONS

International search report and written opinion dated Nov. 21, 2017, for corresponding PCT/EP2017/070543.

*Primary Examiner* — Gilbert Y Lee
(74) *Attorney, Agent, or Firm* — Beusse Wolter Sanks & Maire

(57) ABSTRACT

A gas seal, in particular dry gas seal, which extends in a circumferential direction with respect to an axis, has a rotating slide ring and a stationary slide ring, wherein the stationary slide ring is axially movable. The gas seal has a slide sleeve and a pressure element which bears against the stationary slide ring at a first contact surface by a second contact surface, wherein, by the pressure element, an elastic element axially presses the stationary slide ring by way of the sealing surface of the latter against the rotating slide ring. The seal is arranged at least partially with a fastening portion between the two portions. The first portion is metal, the second portion is ceramic, and the slide sleeve is ceramic.

7 Claims, 1 Drawing Sheet

(56) References Cited

U.S. PATENT DOCUMENTS

| | | | |
|---|---|---|---|
| 7,240,904 B2 | 7/2007 | Droscher et al. | |
| 8,523,186 B2 * | 9/2013 | Schrufer | F16J 15/3472 277/370 |
| 9,518,473 B2 | 12/2016 | Mateman | |
| 2015/0240951 A1 | 8/2015 | Kirchner | |

FOREIGN PATENT DOCUMENTS

| | | |
|---|---|---|
| DE | 202007012050 U1 | 10/2007 |
| DE | 102011007071 A1 | 10/2012 |
| RU | 2622445 C2 | 6/2017 |
| WO | 9604497 A1 | 2/1996 |
| WO | 2009030298 A1 | 3/2009 |
| WO | 2014023581 A1 | 2/2014 |
| WO | 2014037150 A1 | 3/2014 |

* cited by examiner

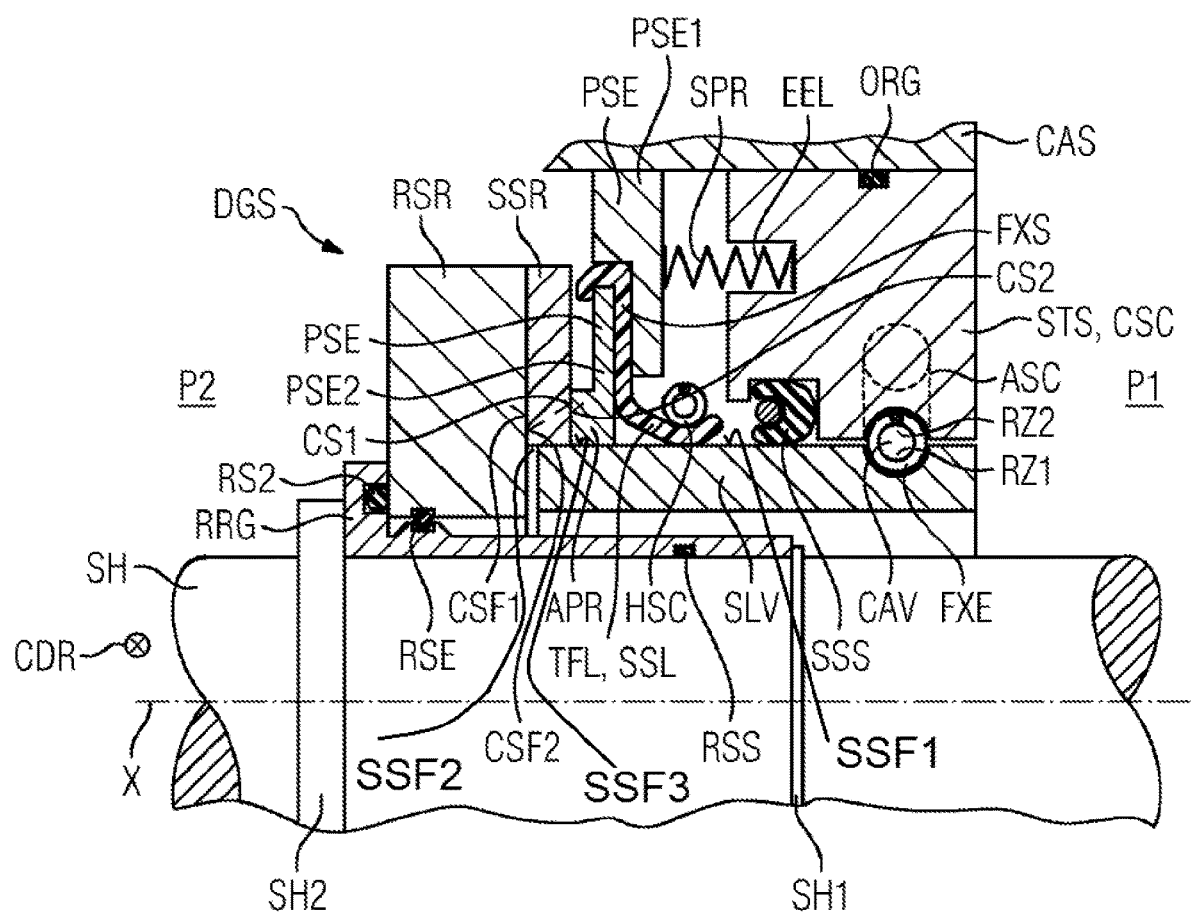

GAS SEAL

CROSS REFERENCE TO RELATED APPLICATIONS

This application is the US National Stage of International Application No. PCT/EP2017/070543 filed Aug. 14, 2017, and claims the benefit thereof. The International Application claims the benefit of European Application No. EP16188481 filed Sep. 13, 2016. All of the applications are incorporated by reference herein in their entirety.

FIELD OF INVENTION

The invention relates to a gas seal, in particular dry gas seal, which extends in a circumferential direction with respect to an axis, comprising a rotating slide ring and a stationary slide ring, wherein the stationary slide ring is axially movable, wherein the gas seal comprises a slide sleeve, wherein, the gas seal comprises a pressure element which bears against the stationary slide ring at a first contact surface by means of a second contact surface, wherein, by means of the pressure element, an elastic element axially presses the stationary slide ring by way of the sealing surface of the latter against the rotating slide ring RSR.

BACKGROUND OF INVENTION

Gas seals or dry gas seals of the type defined in the introduction are already known from various publications. Examples of these are WO2014/037150 and WO2014/023581.

Dry gas seals of said type generally comprise components composed of ceramic, in particular manufactured from silicon carbide or tungsten carbide. The ceramic components are normally the stationary and/or rotating slide rings and, if appropriate, adjoining elements. A further example from the patent literature is given by DE 39 25 403 C2.

Features of the shaft seal defined in the introduction are already known from DE 202 17 983 U1, DE 20 2007 012050 A1, DE 10 2011 007071 A1, WO 96/04497 A 1.

In addition to the primary sealing of the gas seal, in particular dry gas seal, it is required that both the rotating sealing ring and the stationary sealing ring are sealed off with respect to the rotor or stator (housing and possibly connected components) by means of a substantially static seal. Owing to the possible axial vibrations, it is necessary for at least one of these seals to be axially movable. This is generally at least the stationary seal because the mobility is easier to realize at this component. Owing to the high dynamics of the movements, this secondary seal is subjected to extreme loading.

It has been found that, in conventional designs, the secondary seal, which generally has to ensure an axial movement, was cumbersome, relatively ineffective and susceptible to defects.

SUMMARY OF INVENTION

It is an object of the invention to improve the secondary seal—hereinafter referred to as seal (drawing: seal SSL).

To achieve the object according to the invention, a gas seal of the type defined in the introduction having the additional features of the claims is proposed. The dependent claims with respective back references encompass advantageous refinements of the invention.

The gas seal according to the invention is designed in the form of a shaft seal.

Terms such as "axial", "radial", "tangential" or "circumferential direction"—if not specified otherwise relate to the central axis in whose circumferential direction the gas seal according to the invention extends. Generally, said axis coincides with a shaft rotation axis, in relation to which the gas seal forms a shaft seal in order to seal off a gap between a rotatable shaft or a rotor and a housing.

Advantageously, the shaft seal or the gas seal according to the invention is designed in the form of an independently transportable insert (often also referred to as a cartridge), with the result that this modularity allows for example simple replacement of a defective gas seal with an intact gas seal. In principle, according to the invention, it is also possible for the stator to be a direct, if appropriate single-piece, component of the housing of the machine in which the gas seal is installed, for example a radial turbocompressor.

One advantageous refinement of the invention provides that the seal is designed so as to consist at least partially of Teflon.

One advantageous refinement of the invention provides that the pressure element has two circumferentially extending portions which are able to be separated from one another, a first portion, against which the elastic element bears, and a second portion, which has the second contact surface, wherein the seal is arranged at least partially with a fastening portion between the two portions.

One advantageous refinement of the invention provides that the second portion comprises the third slide surface.

One advantageous refinement of the invention provides that the first portion consists substantially of metal.

One advantageous refinement of the invention provides that the second portion consists substantially of ceramic.

One advantageous refinement of the invention provides that the guide sleeve consists of ceramic, in particular of silicon carbide or tungsten carbide. The slide ring and the slide sleeve advantageously consist of said ceramics owing to their permanently high dimensional accuracy requirements.

One advantageous refinement of the invention provides that the seal extends radially inward beyond the contact surface between the two portions of the pressure element, and also extends axially beyond the transition point between the pressure element and the slide sleeve on an axial side with the higher pressure.

One advantageous refinement of the invention provides that, by means of the first slide surface, the slide sleeve radially guides the stationary slide ring on a second slide surface along the axial direction of mobility.

One advantageous refinement of the invention provides that, with respect to the first slide surface, the third slide surface has smaller radial play than the second slide surface.

The thermal expansion of these ceramic materials amounts to approximately $3.5 \times 10^{-6}$ m/K times meters. In comparison with this, the thermal expansion of steel, that material which is generally fitted adjacent to these ceramics of the seals, amounts to approximately $11 \times 10^{-6}$ m/K times meters. The relative expansion between the ceramic components and the steel components resulting from this difference between the coefficients of thermal expansion has to be compensated accordingly, and so simple fastening of the ceramic shaft seal components to the steel components is not an option. For this purpose, one advantageous refinement proposes that the slide sleeve is fastened to a stator of the gas seal, wherein the slide sleeve has a first recess, extending in the circumferential direction, and the stator has a second recess, extending in the circumferential direction and situated opposite the first recess in the region of the fastening, such that the first recess and the second recess define a common cavity, which extends in the circumferential direction in an annular manner, wherein, in the cavity, there is arranged an elongate fixing element which at least partially fills the first recess and second recess such that an unlimited axial relative movement is possible only when the fixing element is radially deformed.

In order that the fixing element is able to be fitted in a simple manner, according to an advantageous refinement, it is formed elastically such that a bending deformability is provided transversely with respect to the longitudinal direction of the fixing element. In this way, it is possible for the fixing element to be inserted, with corresponding bending, into the circumferentially extending curved cavity, advantageously tangentially. Particularly advantageously, for this purpose, either the stator or the slide sleeve itself has an insertion channel, opening out into the cavity, such that the fixing element is able to be introduced into the cavity through the insertion channel. The insertion channel expediently runs tangentially with respect to the cavity extending in the circumferential direction.

Another advantageous refinement provides that the slide sleeve consists of ceramic and the stator consists of metal.

Another advantageous refinement provides that the stator or the slide sleeve has an insertion channel, opening out into the cavity, such that the fixing element is able to be introduced into the cavity through the insertion channel.

Another advantageous refinement provides that the insertion channel runs, at least in portions, substantially tangentially with respect to the cavity.

Another advantageous refinement provides that the slide sleeve and/or the stationary slide ring and/or the second portion consist/consists, at least in portions or completely, of tungsten carbide or silicon carbide.

Another advantageous refinement provides that the fixing element is designed in the form of a helical spring, in particular in the form of a tube spring or worm spring.

Another advantageous refinement provides that the fixing element is also designed in a manner deformable in the radial direction. For this purpose, the fixing element may be designed in particular in the form of a helical spring and particularly advantageously in the form of a tube spring or worm spring. In principle, it is possible here for the fixing element to consist of an elastic material or for example of a helically shaped steel profile which particularly advantageously has a flat profile. The helical spring or the fixing element can be introduced into the cavity in a manner substantially free of play or can be arranged in the cavity such that the slide sleeve is securely fastened to the stator. An elastic deformation of the fixing element gives rise to the additional advantage of an elasticity of the gas seal, in particular in the axial direction. Despite the axial flexibility, the fixing according to the invention of the slide sleeve is sufficient for establishing the required stability, in particular with respect to vibrations. Since the rotor also vibrates axially in the case of for example a turbomachine, the additional axial elasticity in the fastening of the slide sleeve is particularly advantageous for the seal.

BRIEF DESCRIPTION OF THE DRAWINGS

The invention is discussed in more detail below on the basis of an exemplary embodiment with reference to a drawing, in which:

FIG. 1 shows a schematic longitudinal section through a gas seal according to the invention.

DETAILED DESCRIPTION OF INVENTION

FIG. 1 shows a schematic longitudinal section through a gas seal according to the invention with an adjoining housing CAS and an adjoining shaft SH.

The gas seal DGS according to the invention is designed in the form of an insert which is able to be transported independently of the housing CAS and the shaft SH.

A rotor ring RRG is fastened radially and axially on the shaft SH by means of two shoulders SH1, SH2, wherein the two shoulders SH1, SH2, are fastened in a detachable manner to the shaft SH in a way not illustrated in more detail. The rotor ring RRG has, toward the shaft SH, a rotating static seal RSS.

In the drawing, there is a machine inner pressure P2 on the left-hand side and a lower outer pressure P1 on the right-hand side.

A rotating slide ring RSR is fastened to the rotor ring RRG by means of a worm spring RSE, wherein the worm spring RSE allows an axial movement of the rotating slide ring RSR out of the target position only with radial deformation. The rotating slide ring RSR is sealed off with respect to the rotor ring RRG by way of a second rotating seal RS2.

Axially opposite a sealing surface CSF1 of the rotating slide ring RSR is a stationary slide ring SSR with a corresponding sealing surface CSF2, wherein, by means of a pressure element PSE, a spring SPR axially presses the stationary slide ring SSR by way of the sealing surface CSF2 of the latter against the rotating slide ring RSR.

The pressure element PSE is split axially into two portions which extend in a circumferential direction, a first portion PSE1 and a second portion PSE2, wherein, by means of the spring SPR, the two portions are pressed axially against one another and axially against the stationary slide ring SSR. The first portion PSE1 is of metallic design, and the second portion PSE2 is of ceramic design, advantageously being composed of the same ceramic as a slide sleeve SLV which extends in a circumferential direction and which serves as a guide for an axial movement of the pressure element PSE and the stationary slide ring SSR. The play between the slide sleeve SLV and the second portion PSE2 is formed to be small, with the result that the second portion, and thus the entire pressure element PSE, is guided in a manner radially mounted and axially displaceable. One advantageous refinement of the invention provides that a first slide surface SSF1 of the slide sleeve SLV radially guides a second slide surface SSF2 of the stationary slide ring SSR on along the axial direction of mobility. The first slide surface SSF1 of the slide sleeve SLV also guides a third slide surface SSF3 of the second portion PSE2 along the axial direction of mobility. The illustration of the radial play of the slide sleeve SLV with respect to the elements slide ring SSR and pressure element PSE is not representative in the drawing, it also being possible at any rate for the play to be smaller, and also the ratio of the radial plays is not reproduced in a representative manner.

The radial play between the slide sleeve SLV and the second portion PSE2 advantageously amounts to less than 1 mm with respect to the diameter, with the result that the second portion, and thus the entire pressure element PSE, is guided in a manner radially mounted and axially displaceable.

The second portion PSE2 bears with an axial projection APR, which has a first axial contact surface CS1, against a second contact surface CS2 of the stationary slide ring SSR. The two contact surfaces CS1, CS2 are formed in a manner lapped against one another, with the result that the almost play-free contact acts as a seal.

Between the two portions PSE1, PSE2 of the pressure element PSE, a circumferentially extending seal SSL, which is designed in the form of a Teflon seal TFL, is arranged and held on the stationary slide ring SSR by means of the contact pressure of the pressure element PSE1 such that the two first portions PSE1, PSE2 bear sealingly against one another.

The stationary slide ring SSR is guided in a manner axially displaceable on the slide sleeve SLV with little radial play such that the mobility degree of freedom is limited to the axial movement. Also, the second portion PSE2 of the pressure element PSE is likewise mounted. Both the stationary slide ring SSR and the slide sleeve SLV and also the second portion PSE2 are manufactured from tungsten carbide or silicon carbide.

The seal SSL of the pressure element PSE extends radially inward beyond the contact surface between the two portions PSE1, PSE2 of the pressure element PSE. The seal SSL also extends axially beyond the transition point between the pressure element PSE and the slide sleeve SLV on the side with the higher pressure. Owing to the small radial play between the slide sleeve SLV and the second portion PSE2 of the pressure element PSE (which is also smaller than the play between the stationary slide ring SSR and the slide sleeve SLV), the seal SSL is, under pressure, extruded only slightly into this radial gap such that sealing is ensured.

The stationary slide sleeve SLV is fastened to a stator STS by means of a fastening element FXE, wherein the stator STS is at the same time a housing CSC of the gas seal DGS.

A cavity CAV is defined by a first recess RZ1, extending in a circumferential direction CDR, of the slide sleeve SLV and by a second recess RZ2, extending in the circumferential direction CDR and situated opposite in the region of the fastening, of the stator STS.

The housing CSC of the gas seal DGS is sealed off with respect to the housing CAS of the turbomachine by means of an O-ring seal ORG. In principle, it is also conceivable for the housing of the turbomachine and the housing CSC of the gas seal DGS to be a single component. The fixing element FXE is able to be introduced tangentially into the cavity CAV through a substantially tangential insertion channel ASC.

The fixing element FXE is designed in the form of a worm spring and, accordingly, it is basically a helical spring, advantageously composed of a metallic material. For the purpose of sealing, a stator seal SSS is also provided between the slide sleeve SLV and the stator STS to maintain the pressure difference between the outer pressure P1 and the inner pressure P2.

For the purpose of being secured in the desired position, the seal SSL or Teflon seal TFL is, by means of a helical spring element HSC extending in the circumferential direction CDR, pressed radially with the radially inner, projecting end against the slide sleeve SLV such that any differential pressure, in particular in the region between the static slide ring SSR and the slide sleeve SLV, in this case between the pressure element PSE and the slide sleeve SLV, is sealed off by the Teflon seal TFL. In this case, the Teflon seal TFL is partially extruded into a gap between the slide sleeve SLV and the pressure element. The helical spring element HSC holds the Teflon seal TFL merely in the position suitable for this purpose.

The invention claimed is:

1. A gas seal which extends in a circumferential direction with respect to an axis, comprising:
    a rotating slide ring and a stationary slide ring,
    wherein the stationary slide ring is axially movable,
    wherein the gas seal comprises a slide sleeve,
    wherein the gas seal comprises a pressure element that comprises a second contact surface which bears against a first contact surface of the stationary slide ring,
    wherein the pressure element is axially movable,
    wherein, by means of the pressure element, an elastic element axially presses a sealing surface of the stationary slide ring against the rotating slide ring,
    wherein, a first slide surface of the slide sleeve radially guides a third slide surface of the pressure element along an axial direction of mobility,
    wherein the pressure element comprises a seal which seals off a circumferentially extending gap between the pressure element and the slide sleeve,
    wherein the pressure element comprises two circumferentially extending portions which are able to be separated from one another, a first portion, against which the elastic element bears, and a second portion, which comprises the second contact surface,
    wherein the seal is arranged at least partially with a fastening portion between the first portion and the second portion,
    wherein the second portion comprises the third slide surface,
    wherein the first portion consists substantially of metal,
    wherein the second portion consists substantially of ceramic, and
    wherein the slide sleeve consists of ceramic.

2. The gas seal as claimed in claim 1, wherein the seal is designed so as to consist at least partially of Teflon.

3. The gas seal as claimed in claim 1, wherein the seal extends radially inward beyond from between the two portions of the pressure element, and also extends axially beyond a transition point between the pressure element and the slide sleeve on an axial side with a higher pressure.

4. The gas seal as claimed in claim 1, wherein, by means of the first slide surface, the slide sleeve radially guides the stationary slide ring on a second slide surface along the axial direction of mobility.

5. The gas seal as claimed in claim 4, wherein, with respect to the first slide surface, the third slide surface comprises smaller radial play than the second slide surface.

6. The gas seal as claimed in claim 1, wherein the seal comprises a spring element, which extends in the circumferential direction and which is radially prestressed and, by means of the prestressing, presses the seal radially against the slide sleeve.

7. The gas seal as claimed in claim 1, wherein the gas seal is a dry gas seal.

* * * * *